United States Patent [19]

Pearson

[11] Patent Number: 4,723,765

[45] Date of Patent: Feb. 9, 1988

[54] PISTON ROD TIE DOWN CLIP

[75] Inventor: Leck G. Pearson, Royston, Ga.

[73] Assignee: Monroe Auto Equipment Company, Monroe, Mich.

[21] Appl. No.: 798,105

[22] Filed: Nov. 14, 1985

[51] Int. Cl.4 .............................................. F16F 5/00
[52] U.S. Cl. .................................... 267/64.12; 16/66; 188/67; 188/300
[58] Field of Search .................. 267/64.12, 66, 67, 68, 267/120; 16/51, 66, 67, 68, 69, 70, 84; 188/67, 265, 300; 292/278

[56] References Cited

U.S. PATENT DOCUMENTS

| | | | |
|---|---|---|---|
| 2,534,651 | 12/1950 | Abos et al. | 188/67 X |
| 2,843,226 | 7/1958 | Nordmark | 16/66 X |
| 4,309,027 | 1/1982 | Mölders et al. | 188/300 X |
| 4,449,702 | 5/1984 | Hasegawa | 267/64.12 |

FOREIGN PATENT DOCUMENTS 245575 7/1963 Australia .................................. 16/66

Primary Examiner—Duane A. Reger
Assistant Examiner—Matthew C. Graham
Attorney, Agent, or Firm—Harness, Dickey & Pierce

[57] ABSTRACT

A tie-down clip is described which is adapted for retaining the rod of a pressurized suspension unit in a retracted position within the suspension unit cylinder thereby protecting the rod from damage during shipping and handling and also reduces the size of the necessary packaging for the suspension unit. The tie-down clip has a hook-shaped end which engages the cylinder of the suspension unit and a top plate which receives the piston rod and engages a stop formed by the rod to retain the rod from extension. Two embodiments are described having differing shapes of apertures in the tie-down clip top plate.

5 Claims, 4 Drawing Figures

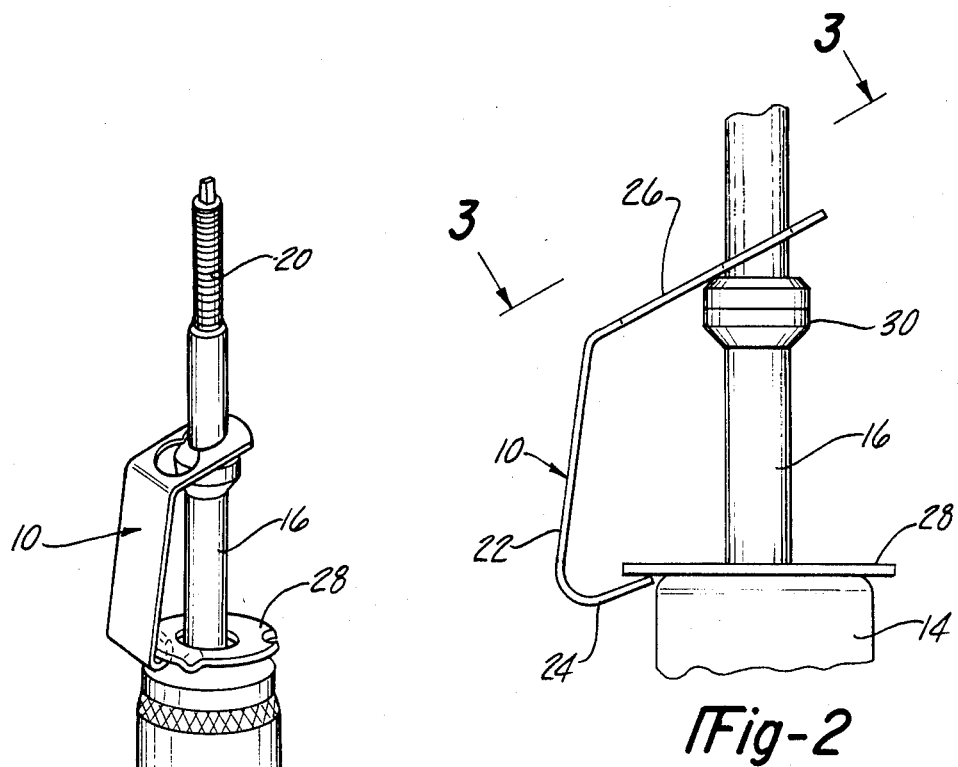
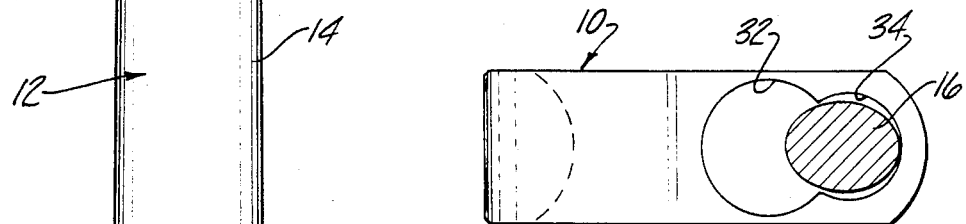
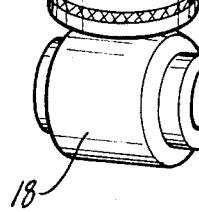
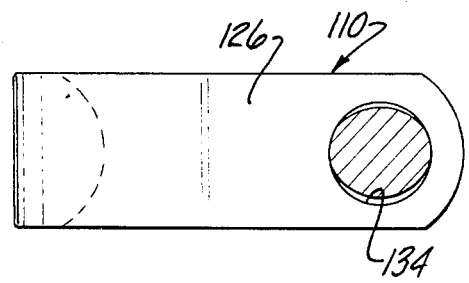

4,723,765

PISTON ROD TIE DOWN CLIP

BACKGROUND AND SUMMARY OF THE INVENTION

This invention relates to a tie-down clip for retaining the piston rod of a pressurized suspension unit in a retracted position within the suspension unit cylinder during shipment and handling.

Many suspension systems of current motor vehicles include a suspension unit in the form of a cylinder with an extending rod. Many such devices further have an internal chamber filled with a gas under pressure or employ another type of internal spring which exerts a force on the piston rod of the suspension unit, urging it to an extended position. As a result, the piston rod of such suspension units is fully extended from its cylinder when the unit is not installed on the motor vehicle or subjected to external forces. The fully extended position of the rod exposes it to damage during handling and shipment, increases the size of shipping containers for the suspension units, and requires more area for storage and display.

In view of the above, it is an object of this invention to provide a device which enables the rod of a suspension unit to be retained in a retracted position within the suspension unit cylinder until the device is installed on a vehicle.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE INVENTION

FIG. 1 is a perspective view of a piston rod tie-down clip in accordance with this invention shown installed on a suspension unit thereby retaining the rod of the suspension unit in a retracted position;

FIG. 2 is a partial elevational view of the suspension unit and tie-down clip shown in FIG. 1;

FIG. 3 is a cross sectional view taken along line 3—3 of FIG. 2 particularly showing the top plate of the tie-down clip in accordance with this invention; and FIG. 4 is a cross-sectional view of an alternate embodiment of a piston rod tie-down clip in accordance with this invention taken in the direction of line 3—3 of FIG. 2.

DETAILED DESCRIPTION OF THE INVENTION

A tie-down clip 10 in accordance with a first embodiment of this invention is shown in FIGS. 1, 2, and 3 and is adapted for use with an exemplary suspension unit 12. As best shown in FIG. 1, suspension unit 12 comprises cylinder 14 having an internally disposed piston (not shown) which is connected to piston rod 16 which extends from the cylinder. Tie-down clip 10 is preferably used with the type of suspension unit 12 having an internally pressurized chamber or other means of providing a compliant force upon rod 16 urging it to an extended position from cylinder 14. Suspension unit 12 is conveniently attached to fastening points of a motor vehicle suspension system by fasteners passed through collar 18 and threaded onto rod 16 at threaded end 20. Suspension unit 12 is, however, described for illustration purposes only. Numerous other configurations for suspension unit 12 could be employed including ones having differing means for connection to the associated suspension components of a motor vehicle.

In accordance with this invention, tie-down clip 10 is employed to retain rod 16 in a retracted position within cylinder 14. Tie-down clip 10 is formed preferably from sheet metal stock and defines a generally C-shaped member, including central portion 22, lower hook 24, and top plate 26. Tie-down clip 10 is adapted to mechanically engage both cylinder 14 and rod 16 to retain the rod in a retracted position within cylinder 14, thereby protecting the rod from damage and reducing the length of suspension unit 12.

Lower hook 24 of tie-down clip 10 engages a depression in cylinder 14, or an extending flange formed integrally by the cylinder, or by a component attached to the cylinder. As shown in FIGS. 1 and 2, means for engagement by lower hook 24 are provided by cylinder plate 28 which is welded or otherwise secured to cylinder 14.

Rod 16 is engaged by tie-down clip 10 by providing a locally radially extending stop 30. Top plate 26 defines a pair of connected generally circular holes 32 and 34. Hole 32 is sufficiently large to enable radially extending stop 30 to pass therethrough, whereas hole 34 is smaller than stop 30.

In use, rod 16 is compressed by an external force to a retracted position within cylinder 14. Tie-down clip 10 may then be placed onto rod 16 and positioned so that the rod passes through the smaller top plate hole 34. Lower hook 24 is then positioned to engage cylinder plate 28. When the external force is relieved, tie-down clip 10 restrains rod 16 from extending. When it is desired to remove tie-down clip 10, an external force on rod 16 will enable lower hook 24 to be disengaged. Alternately, once rod 16 is compressed, tie-down clip top plate 26 can be moved to enable stop 30 to pass through hole 32 so that the rod can be extended.

An alternate embodiment of a piston rod tie-down clip 110 is shown in FIG. 4. Tie-down clip 110 is identical in all respects to tie-down clip 10 except that its top plate 126 includes only one hole 134 which is smaller than portion 30. Tie-down clip 110 operates like clip 10 except that the procedure of positioning the top plate to permit portion 30 to pass therethrough could not be performed.

Although the above described embodiments of a tie-down clip 10 and 110 are disclosed as being used with a suspension unit having a rod with a radially projecting stop 30, this invention could also be practiced with a suspension unit having a conventional smooth cylindrical rod. For that application, tie-down clip 10 or 110 would frictionally engage the piston rod by forming an aperture in the tie-down clip top plate which provides clearance with rod 16, but engages the rod when it is tipped with respect to the rod.

While the above description constitutes the preferred embodiments of the present invention, it will be appreciated that the invention is susceptible to modification, variation and change without departing from the proper scope and fair meaning of the accompanying claims.

What is claimed is:

1. A tie-down clip for use with a suspension unit of the type wherein a piston rod is retractable into and extendible from a cylinder, said tie-down clip adapted for retaining said piston rod in a retracted position within said cylinder, thereby protecting said rod from damage and reducing the overall length of said suspension unit, said suspension unit being of the type providing an internal force urging said piston rod to an extended position comprising, in combination:

said tie-down clip having a lower hook portion, a central substantially planar elongated portion and a top plate portion defining an aperture, and a pair of axially spaced radially outwardly extending shoulders one being a stop portion defined by said piston rod and the other being immovably connected to said cylinder, said top plate portion aperture being shaped to receive said rod and to engage said stop portion and said lower hook portion being adapted to seat against said flange whereby said tie-down clip, when engaging said shoulders, retains said rod in said retracted position in said cylinder.

2. The tie-down clip according to claim 1 wherein said top plate portion aperture defines a portion enabling said stop portion to pass therethrough and defining another portion which engages said stop portion.

3. The tie-down clip according to claim 2 wherein said top plate portion aperture is defined by a pair of circular holes joined together wherein one of said holes has a diameter less than said stop portion and the other of said holes has a diameter greater than said stop portion.

4. A tie-down clip for use with a suspension unit of the type wherein a piston rod is axially retractable into and extendible from a cylinder, said tie-down clip adapted for retaining said piston rod in the retracted position within said cylinder, thereby protecting said rod from damage and reducing the overall axial length of said suspension unit, said suspension unit being of the type providing an internal force urging said piston rod to an extended position comprising, in combination:

said tie-down clip having a lower hook portion, a central substantially planar elongated portion extending from said hook portion and a top plate portion angularly extending from said central portion and defining an aperture, a pair of axially spaced annular shoulders one extending radially outwardly from said piston rod and movable therewith and the other being fixed to and extending outwardly from said cylinder, said top plate portion aperture being defined by a pair of circular holes joined together wherein one of said holes has a diameter less than said stop portion and the other of said holes has a diameter greater than said stop portion, said tie-down clip lower hook portion engaging the shoulder on said cylinder and said top plate portion engaging the shoulder on said piston whereby said tie-down clip, when engaging said shoulders, retains said rod in said retracted position in said cylinder.

5. A tie-down clip for use with a suspension unit of the type wherein a piston rod is retractable into and extendible from a cylinder, said tie-down clip adapted for retaining said piston rod in a retracted position within said cylinder, thereby protecting said rod from damage and reducing the overall length of said suspension unit, said suspension unit being of the type providing an internal force urging said piston rod to an extended position comprising, in combination:

a locally radially outwardly extending annular stop on said piston rod, an annular shoulder extending from the cylinder, and a tie-down clip having a lower hook portion adapted to engage said annular shoulder and a top plate portion adapted to engage said stop, said hook portion being defined by a width less than the diameter of said cylinder and said top plate portion having an aperture being defined by a circular hole having a diameter greater than said rod but less than said stop portion thereby engaging said stop portion whereby said tie-down clip, when engaging the shoulder and the stop, retains said rod in said retracted position in said cylinder.

* * * * *